(12) United States Patent
You et al.

(10) Patent No.: US 8,339,999 B2
(45) Date of Patent: Dec. 25, 2012

(54) METHOD FOR IMPLEMENTING CENTRALIZED SERVICE CHAIRMAN SIDE CONFERENCE SERVICE OF IP MULTIMEDIA SUBSYSTEM

(75) Inventors: Shilin You, Shenzhen (CN); Jiyan Cai, Shenzhen (CN); Zhendong Li, Shenzhen (CN); Zhenwu Hao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 345 days.

(21) Appl. No.: 12/810,895

(22) PCT Filed: Dec. 23, 2008

(86) PCT No.: PCT/CN2008/073661
§ 371 (c)(1),
(2), (4) Date: Jun. 28, 2010

(87) PCT Pub. No.: WO2009/092256
PCT Pub. Date: Jul. 30, 2009

(65) Prior Publication Data
US 2010/0296418 A1  Nov. 25, 2010

(30) Foreign Application Priority Data
Dec. 29, 2007 (CN) .......................... 2007 1 0301670

(51) Int. Cl.
*H04L 12/16* (2006.01)
(52) U.S. Cl. ........................................ 370/260; 370/261
(58) Field of Classification Search ........................ None
See application file for complete search history.

(56) References Cited

U.S. PATENT DOCUMENTS

| 6,917,657 B2 * | 7/2005 | McCarty, Jr. ................. 375/355 |
| 7,586,857 B2 * | 9/2009 | Ejzak et al. ................... 370/260 |
| 7,636,750 B2 * | 12/2009 | Haldar ............................. 709/204 |
| 8,218,748 B2 * | 7/2012 | Kondapalli et al. ...... 379/201.02 |
| 2004/0013254 A1 * | 1/2004 | Hamberg et al. ........ 379/202.01 |

(Continued)

FOREIGN PATENT DOCUMENTS

CN 1859426 11/2006

(Continued)

OTHER PUBLICATIONS

International Search Report, prepared by ISA/CN for PCT/CN2008/073661, mailed on Mar. 26, 2009.

*Primary Examiner* — Robert Wilson
(74) *Attorney, Agent, or Firm* — Design IP

(57) ABSTRACT

A method for implementing a chairman side conference service of an IP Multimedia Subsystem centralized service is disclosed. A non ICS UE has contracted a conference service and is currently in calls with multiple UEs. The method for implementing the conference service when the non ICS UE serves as a chairman UE comprises: the chairman UE originating a conference setup request to an eMSC; after receiving the request, the eMSC sending a session request message for setting up the conference service to a conferencing server according to the address of the conferencing server to which the chairman UE belongs; the conferencing server returning a success response message to the eMSC; after receiving the response, the eMSC inviting the UEs, which are currently in calls with the chairman UE, to participate in the conference, and returning a conference setup success message to the chairman UE after the participation is successful.

10 Claims, 4 Drawing Sheets

U.S. PATENT DOCUMENTS

| | | |
|---|---|---|
| 2004/0190498 A1 | 9/2004 | Kallio et al. |
| 2004/0196867 A1* | 10/2004 | Ejzak et al. .................. 370/468 |
| 2005/0058125 A1 | 3/2005 | Mutikainen et al. |
| 2010/0296418 A1* | 11/2010 | You et al. ...................... 370/261 |
| 2011/0145388 A1* | 6/2011 | Hao et al. ...................... 709/223 |
| 2011/0165856 A1* | 7/2011 | You et al. .................. 455/404.1 |
| 2011/0258300 A1* | 10/2011 | Hao et al. ...................... 709/221 |
| 2012/0057569 A1* | 3/2012 | Xie et al. ...................... 370/331 |

FOREIGN PATENT DOCUMENTS

| | | |
|---|---|---|
| CN | 101034960 | 9/2007 |
| CN | 101198101 | 6/2008 |

* cited by examiner

METHOD FOR IMPLEMENTING CENTRALIZED SERVICE CHAIRMAN SIDE CONFERENCE SERVICE OF IP MULTIMEDIA SUBSYSTEM

TECHNICAL FIELD

The present invention relates to the communication field, and particularly, to a method for implementing a chairman side conference service of an IP Multimedia Subsystem centralized service.

BACKGROUND OF THE INVENTION

The Internet Protocol (IP) Multimedia Core Network Subsystem (IMS), which is brought forward by the 3rd Generation Partnership Project (3GPP), is a network architecture based on IP. The IMS has built an open and flexible service setting, supports multimedia application, and provides abundant multimedia services for users.

The IMS is a telecommunication network architecture based on IP, and is not related to the access technique. The IMS can not only provide services for Packet Switching (PS) assess networks such as General Packet Radio Service (GPRS), Wireless Local Area Network (WLAN) etc., but can also provide services for mobile cellular networks such as Global System for Mobile communications (GSM), Universal Mobile Telecommunications System (UMTS), etc.

The mobile cellular networks, such as GSM, UMTS, etc., apply circuit switched techniques, referred to as Circuit Switched (CS) domain, and can provide basic voice services and supplement services based on the voice services for users. When the CS domain accesses the IMS, the CS domain evolves into an access means and the services are solely provided by the IMS uniformly. This technique is called IMS Centralized Service (ICS).

FIG. 1 is a schematic diagram illustrating the framework of the access of a non ICS UE (an ordinary UE without the ICS service capability) under an enhanced network of the IMS centralized control service, involving the following network elements:

101, a User Equipment (UE);
102, an Enhanced Mobile Switch Center (eMSC);
103, a Media Gateway (MGW);
104, a Call Session Control Function (CSCF);
105, a conferencing server, which includes an Application Server (AS), a Multimedia Resource Function Controller (MRFC) and a Multimedia Resource Function Processor (MRFP);
106, a Home Subscriber Server (HSS), storing subscriber data of the CS domain and the IMS domain.

The enhanced MSC server 102 is an enhancement of a CS domain MSC server. Besides implementing access and mobile management of CS user equipments, the enhanced MSC server 102 also serves as a Session Initiation Protocol (SIP) user agent to implement transformation between CS signaling and SIP signaling and access an IMS instead of the user.

The user equipment 101 accesses the enhanced MSC server 102 by CS control signaling. The enhanced MSC server 102 serves as a user agent to access the IMS network instead of the CS user equipment 101 and set up a session connection with a remote user. Meanwhile, the MGW 103 accomplishes the transformation between a media stream on a CS bearer and a media stream on an IP bearer and sets up a media connection between the user equipment 101 and the remote user. Wherein, the Session Initiation Protocol is used between the enhanced MSC server 102 and the CSCF 104 in the IMS network, and the conferencing server 105 in the IMS network provides services related to a conference.

FIG. 2 is a flow chart of an IMS conference service. A UE-A sets up a call with a UE-B, the UE-A keeps this session, and then the UE-A sets up a session with a UE-C and enters a call state. At this moment, the UE-A serves as the chairman of the conference and decides to add the two sessions into the conference, and implements following steps:

201, the UE-A creates a conference, and originates a session request message to a conferencing server according to the address of the conferencing server stored by itself; the message arrives at the conferencing server through a CSCF;

202, the conferencing server returns a success response to the UE-A through the CSCF, thus a bearer connection between the UE-A and the conferencing server is set up.

203, the UE-A instructs the UE-B to participate in the conference;

204, the UE-A instructs the UE-C to participate in the conference, thus a tripartite conferencing call is set up successfully.

Under the architecture shown in FIG. 1, the access of the non ICS UE has not realized the conference service of the IMS centralized control service. Besides, if the eMSC should simulate an IMS UE to carry out the conference service instead of the non ICS UE, the eMSC could not know the address of the conferencing server. Thus how to implement a conference service of the IMS centralized control service after the access of a non ICS UE serving as a chairman is a problem to be solved.

SUMMARY OF THE INVENTION

The technical problem to be solved by the present invention is to provide a method for implementing a chairman side conference service of an IP Multimedia Subsystem centralized service, which can implement a conference service of the IMS centralized control service when a non ICS UE servers as a chairman.

In order to achieve the above destination, the present invention provides a method for implementing a chairman side conference service of an IP Multimedia Subsystem (IMS) centralized service, the method comprising:

receiving a conference setup request originated by a chairman user equipment which is a non IMS centralized service user equipment;

sending a session request message for setting up the conference service to a conferencing server according to an address of the conferencing server to which said chairman user equipment belongs;

receiving a success response message returned by the conferencing server;

inviting one or more user equipments, which are already involved in a call session with said chairman user equipment, to the conference service; and returning a conference setup success message to said chairman user equipment after said one or more user equipments have begun to participate in the conference service.

In the above method of the present invention, said eMSC acquires the address of the conferencing server to which said chairman user equipment belongs according to the following approach:

said chairman user equipment sending a location update request message of circuit switched domain to said eMSC;

said eMSC originating a location update request message of mobile application part to a Home Subscriber Server (HSS);

said HSS loading the address of the conferencing server to which said chairman user equipment belong into user data to be inserted into the eMSC or into a location update success response to be returned to the eMSC; and said eMSC storing the address of the conferencing server to which said chairman user equipment belongs, and returning a location update completion message to said chairman user equipment.

Furthermore, said eMSC acquires the address of the conferencing server to which said chairman user equipment belongs according to the following approach:

said chairman user equipment originating a location update request message of circuit switched domain to the eMSC, and location update of mobile application part being accomplished between said eMSC and a Home Subscriber Server (HSS);

said eMSC originating a registration request message to a home IMS network and indicating that this registration request is originated by the eMSC instead of said chairman user equipment;

a Call Session Control Function (CSCF) originating registration interaction with the HSS, and returning the address of the conferencing server to which said chairman user equipment belongs, which is sent by the HSS or configured locally, to said eMSC through a success response; and said eMSC storing the address of the conferencing server received, and returning a location update completion message to said chairman user equipment.

Furthermore, said eMSC acquires the address of the conferencing server to which said chairman user equipment belongs according to the following approach:

said chairman user equipment originating a location update request message of circuit switched domain to the eMSC, and location update of mobile application part being accomplished between said eMSC and a Home Subscriber Server (HSS);

said eMSC originating a registration request message to a home IMS network and indicating that this registration request is originated by the eMSC instead of said chairman user equipment, and after the registration is successfully completed, returning a location update completion message to said chairman user equipment;

said eMSC sending a registration subscription message to a Call Session Control Function (CSCF), indicating the requirement for acquiring the address of the conferencing server of the user;

said CSCF returning to said eMSC a success response message and a notification message carrying the address of the conferencing server to which said chairman user equipment belongs; and said eMSC returning a success response to the CSCF after receiving the messages, and storing the address of the conferencing server to which said chairman user equipment belongs.

Furthermore, the address of the conferencing server to which said chairman user equipment belongs, which is returned by said CSCF to said eMSC through the notification message, is acquired from the HSS or is configured locally.

Furthermore, said eMSC acquires the address of the conferencing server to which said chairman user equipment belongs according to the following approach:

said chairman user equipment originating a service request to said eMSC; and said eMSC deriving the address of the conferencing server of said chairman user equipment from information of the service request or from stored information of the chairman user equipment.

Furthermore, said eMSC derives the address of the conferencing server to which said chairman user equipment belongs from one or more of a Mobile Country Code (MCC) of said chairman user equipment, a Mobile Network Code (MNC) of said chairman user equipment, a conference identifier, a network identifier and an agreed organization identifier.

Furthermore, the above method may further comprise:

if said service request is not for originating a conference service, said eMSC storing the derived address of the conferencing server to which said chairman user equipment belongs.

Furthermore, the above method may further comprise:

if the user equipment invited to participate in the conference is a multimedia subsystem user equipment, said eMSC directly instructing the user equipment to participate in the conference service;

the user equipment initiatively originating setup of a connection to the conferencing server; and said eMSC releasing a bearer to the user equipment, which is set up before the setup of the conference service.

Furthermore, the above method may further comprise:

if the user equipment invited to participate in the conference is an ordinary mobile terminal or fixed terminal, said eMSC instructing the conferencing server to invite a gateway, to which the user equipment belongs, to participate in the conference service instead of the user equipment; and said gateway originating setup of a bearer to the conferencing server, associating the bearer set up by the conference service with a bearer between said gateway and the user equipment, and releasing a bearer between said gateway and said eMSC, which is set up before the setup of the conference service.

Compared with the prior art, the present invention implements a conference service of an IMS centralized control service when a non ICS UE serves as a chairman, and also solves the problem of how an eMSC should acquire the address of a conferencing server to which the non ICS UE contracting the conference service belongs.

PREFERRED EMBODIMENTS OF THE PRESENT INVENTION

Specific embodiments of the present invention will be described below in details, but the description is not intended to be a limitation of the present invention.

Figure 1:
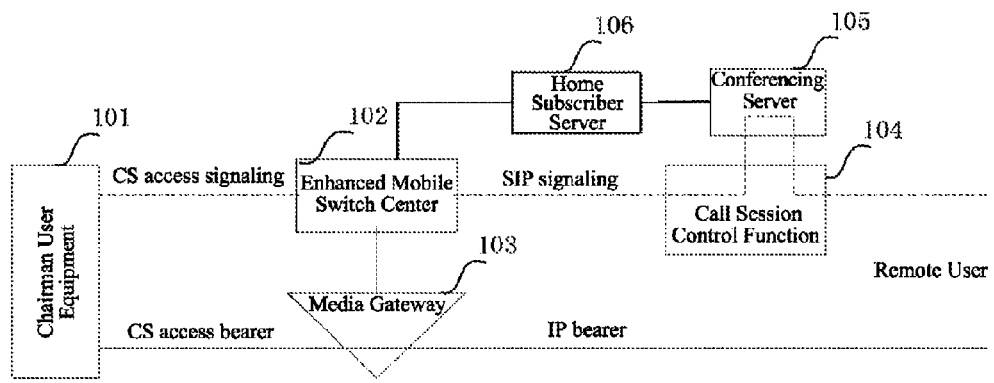
FIG. 1 is a schematic diagram of the framework of the access of a non ICS UE in an enhanced network of the IMS centralized control service.
Figure 2:
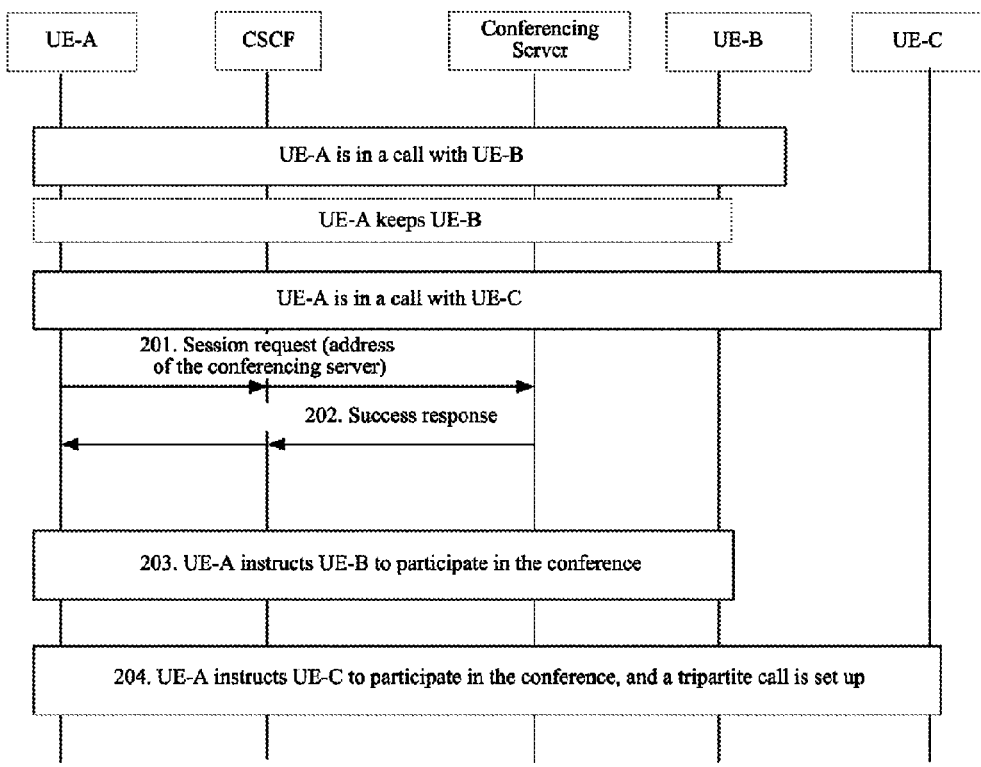
FIG. 2 is a flow chart of an IMS UE implementing a conference service in the prior art.
Figure 3:
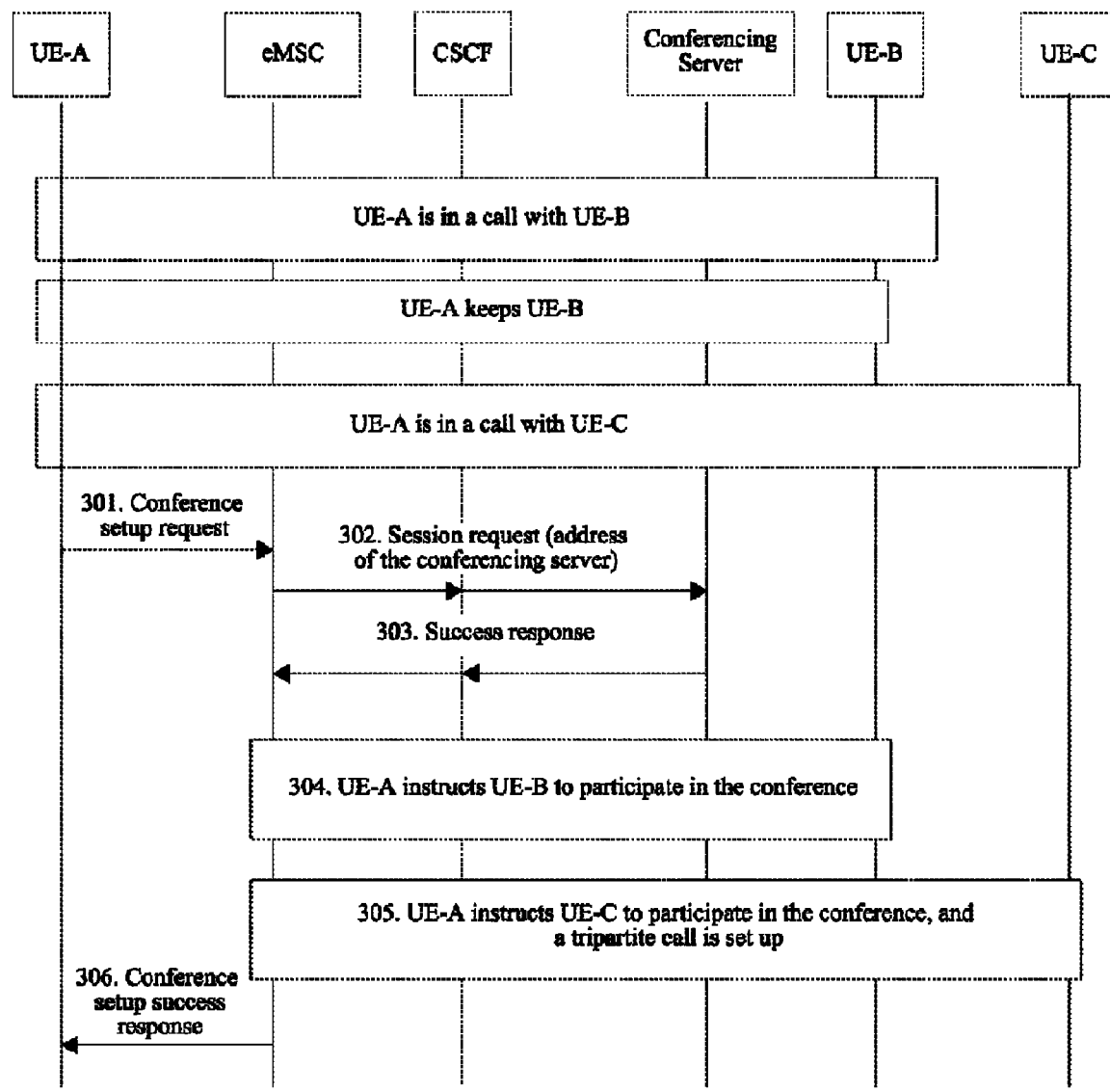
FIG. 3 is a flow chart of the implementation of a conference service of the IMS centralized control service when a non ICS UE serves as a chairman according to an embodiment of the present invention.

FIG. 3 shows a method for implementing a conference service of the IMS centralized control service under the architecture of a network enhanced IMS centralized control service accessed by a non ICS UE. When the non ICS UE has contracted the conference service and the UE-A is currently in calls with a UE-B and a UE-C (as an example in this embodiment, the UE-A requests setup of a conference service with the UE-B and UE-C which are currently in calls with it), wherein the non ICS UE, namely UE-A, serves as the chairman user equipment, specific steps of the method are:

Step 301, the UE-A originates a conference setup request of CS domain to an eMSC;

Step 302, after the eMSC receives the request, according to the address of the conferencing server to which the UE-A belongs, the eMSC sends a session request to the conferencing server through a CSCF to create a conference service;

Step 303, the conferencing server returns a success response to the eMSC through the CSCF, thus a bearer connection between the eMSC and the conferencing server is set up;

Step 304, the eMSC determines that the UE-A is currently in calls with the UE-B and UE-C, then it adds the UE-B into the conference according to the instruction of the UE-A's request;

Herein, if the UE-B is an IMS UE, the eMSC directly instructs the UE-B and invites the UE-B to participate in the conference service, and then the UE-B initiatively originates setup of a bearer to the conferencing server, and the eMSC releases a bearer between the eMSC and the UE-B, which is set up before the setup of the conference service;

If the UE-B is other ordinary terminal, such as a mobile terminal, a fixed terminal or the like, the eMSC instructs the conferencing server, and the conferencing server invites the gateway to which the UE-B belongs to participate in the conference instead of the UE-B. After the gateway originates setup of a bearer to the conferencing server, the gateway associates the bearer set up by the conference service with a bearer between the gateway and the UE-B, and at the same time releases a bearer between the gateway and the eMSC, which is set up before the setup of the conference service.

Step 305, the eMSC adds the UE-C into the conference according to the instruction of the UE-A's request;

This process is identical to that of the eMSC adding the UE-B into the conference according to the instruction of the UE-A's request, and will not be repeated.

Step 306, the eMSC returns a conference setup success message to the UE-A.

Wherein, the processing of the eMSC adding the UE-B or UE-C into the conference may not follow the above order, namely, there is no fixed order between them.

Figure 4:
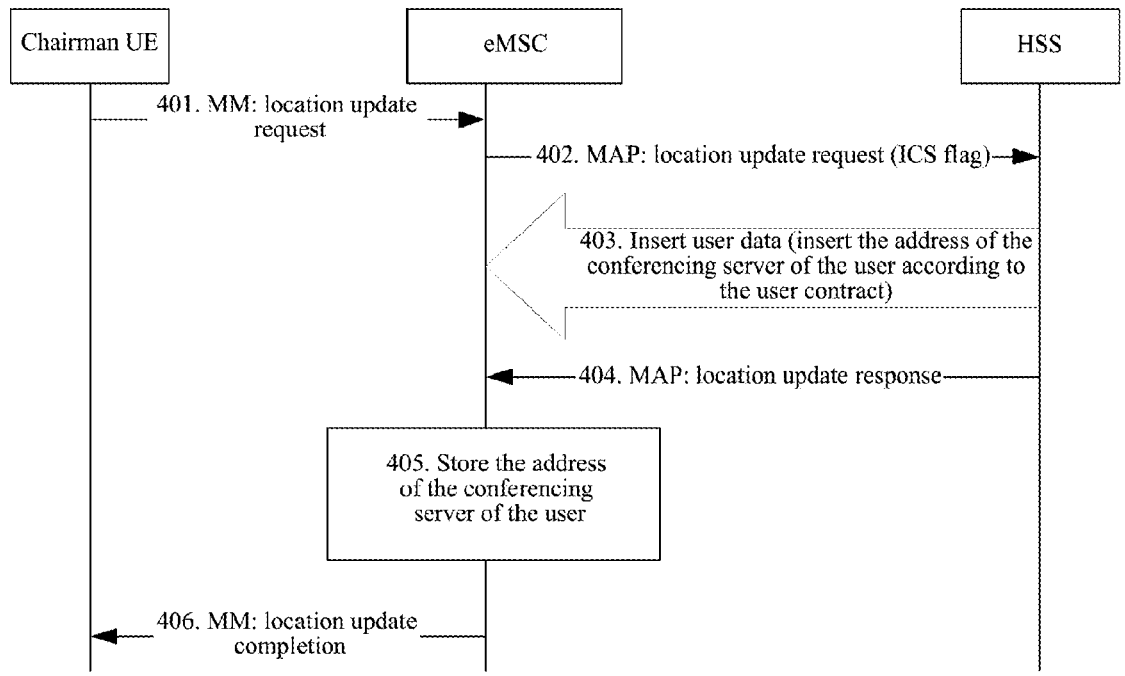
FIG. 4 is a flow chart of an eMSC acquiring the address of a conferencing server according to a first embodiment of the present invention.

FIG. 4 shows the acquisition of the address of a conferencing server by an eMSC according to a first embodiment of the present invention, in which the address of the conferencing server is acquired from a location update response message. The specific steps are:

Step 401, a non ICS UE originates a traditional location update request message to the eMSC, the message being a Mobile Management (MM) message;

Step 402, the eMSC originates a location update request message of Mobile Application Part (MAP) to the HSS, the message carrying an ICS flag indicating the eMSC is an enhanced MSC instead of an ordinary MSC;

Step 403, a HSS inserts user data into the eMSC according to user contract information;

If the non ICS UE has contracted a conference service, the HSS may load the address of the conferencing server to which the non ICS UE belongs into a user data insertion request message.

Step 404, the HSS returns a location update success response message to the eMSC;

If the address of the conferencing server to which the non ICS UE belongs is not loaded in step 403, then it will be loaded into the location update success response message.

Step 405, according to the address of the conferencing server loaded in the step 403 or step 404, the eMSC stores the address of the conferencing server for use by the conference service.

Step 406, the eMSC returns a location update completion message to the non ICS UE.

The order of the step 405 and step 406 can be changed.

Figure 5:
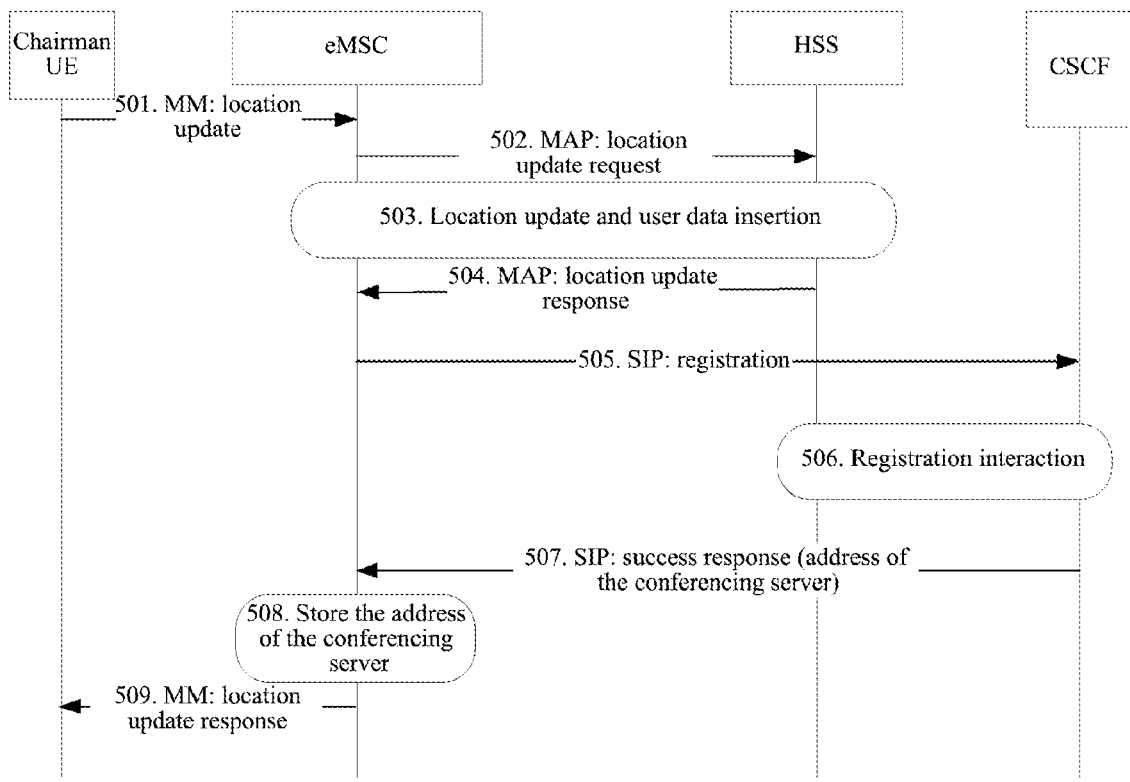
FIG. 5 is a flow chart of an eMSC acquiring the address of a conferencing server according to a second embodiment of the present invention.

FIG. 5 shows the acquisition of the address of a conferencing server by an eMSC according to a second embodiment of the present invention, in which the address of the conferencing server is acquired from a registration response message. The specific steps are:

Step 501, a non ICS UE originates a traditional location update request message to the eMSC, the message being a MM message;

Steps 502-504, location update of MAP is accomplished between the eMSC and a HSS;

Step 505, the eMSC, instead of the non ICS UE, originates a registration message to a home IMS network, the message indicating that the registration is originated by the eMSC, instead of the non ICS UE, to the IMS network;

Step 506, a CSCF originates registration interaction with the HSS;

If the non ICS UE has contracted a conference service and the HSS has configured the address of the conferencing server to which the ICS UE belongs, then the HSS sends the address of the conferencing server to the CSCF.

Step 507, the CSCF returns a SIP success response message to the eMSC;

Depending on the operation policy, the CSCF may choose the address of the conferencing server to which the user belongs sent by the HSS or the address of the conferencing server to which the user belongs configured locally, and load the chosen address of the conferencing server into the SIP success response message;

Step 508, according to the address of the conferencing server loaded in step 507, the eMSC stores the address of the conferencing server for use by the conference service;

Step 509, the eMSC returns a location update completion message to the non ICS UE.

Wherein, there may be no order between the step 508 and step 509.

Figure 6:
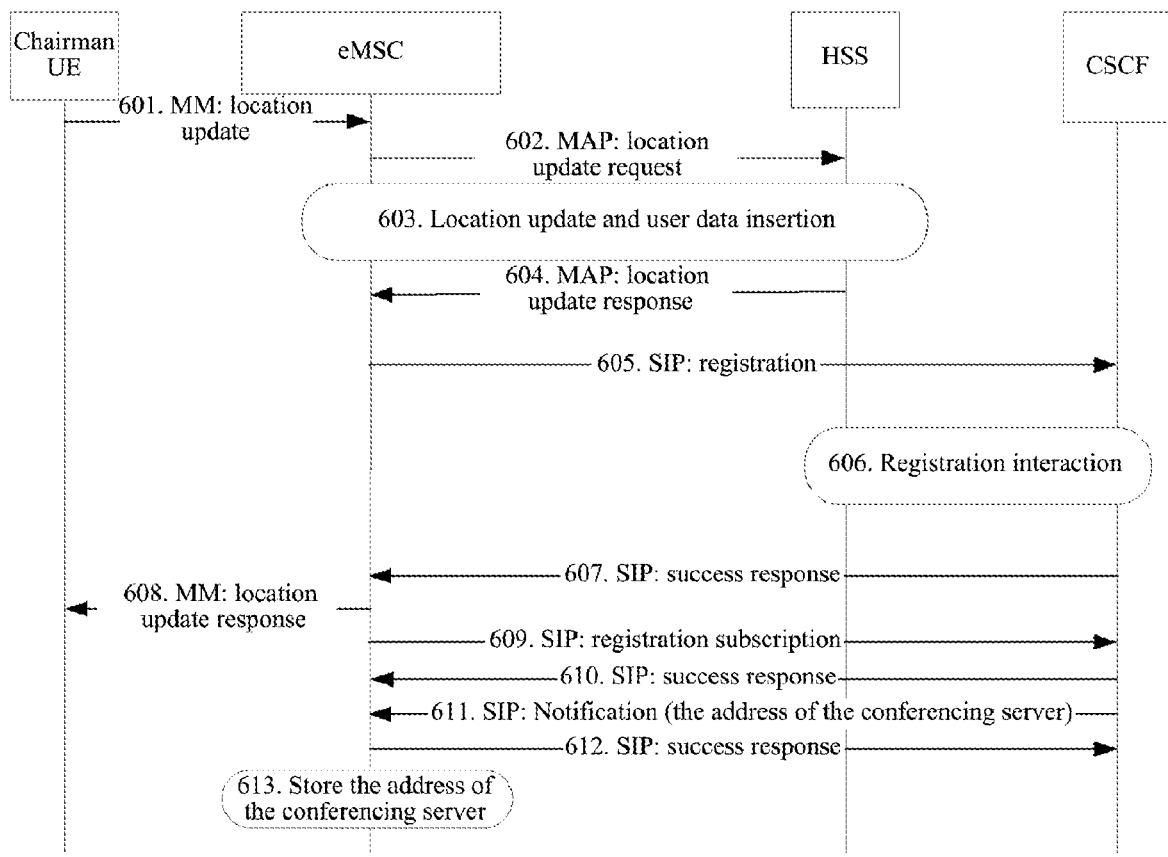
FIG. 6 is a flow chart of an eMSC acquiring the address of a conferencing server according to a third embodiment of the present invention.

FIG. 6 shows the acquisition of the address of a conferencing server by an eMSC according to a third embodiment of the present invention, in which the address of the conferencing server is acquired through subscription. The specific steps are:

Steps 601-605, the same as the steps 501-505 as described above;

Step 606, a CSCF originates registration interaction with a HSS;

Step 607, the CSCF returns a SIP success response message to the eMSC;

Step 608, the eMSC returns a location update completion message to the non ICS UE;

Step 609, the eMSC sends a registration subscription message to the CSCF, indicating the requirement for acquiring the address of the conferencing server of the user;

Step 610, the CSCF returns a success response message to the eMSC;

Step 611, the CSCF sends a notification message to the eMSC, the message carrying the address of the conferencing server to which the user belongs (herein the CSCF may acquire the address of the conferencing server to which the user belongs from the HSS or use the address of the conferencing server to which the user belongs configured locally);

Step 612, the eMSC returns a success response message to the CSCF;

Step 613, according to the address of the conferencing server carried in the step 610, the eMSC stores the address of the conferencing server for use by the conference service.

Wherein, there may no order between the step 608 and steps 609-613.

Figure 7:
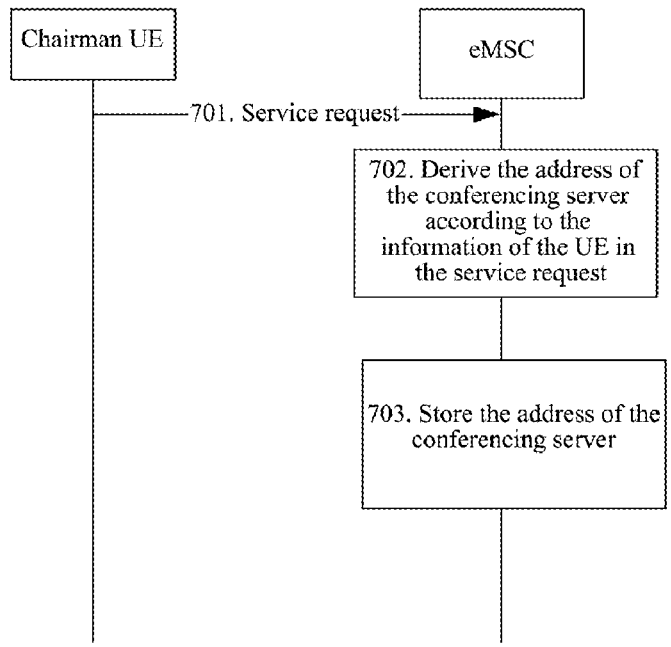
FIG. 7 is a flow chart of an eMSC acquiring the address of a conferencing server according to a fourth embodiment of the present invention.

FIG. 7 shows the acquisition of the address of a conferencing server by an eMSC according to a fourth embodiment of the present invention, in which the eMSC derives the address of the conferencing server from information of a service request or information of the user stored by the eMSC. The specific steps are:

Step 701, a non ICS UE originates a service request to the eMSC;

Herein, the service request may be location update, a call, or even a conference service per se being carried out.

Step 702, the eMSC derives the address of the conferencing server of the non ICS UE from the information of the service request or information of the user of the non ICS UE stored by the eMSC;

If the international mobile subscriber identity of the non ICS UE contains a Mobile Country Code (MCC) and a Mobile Network Code (MNC), the address of the conferencing server can be derived as conference.MCC.MNC.3GPP.org, where the "conference" refers to the conference, the "3GPP" refers to the 3rd Generation Partnership Project and the "org" refers to an organization. Therefore, the eMSC can find the address of the conferencing server according to the derived address of the conferencing server of the non ICS UE.

Step 703, the eMSC stores the address of the conferencing server. If the user can derive the address of the conferencing server during carrying out the conference service in the step 701, this step is not necessary.

Of course, the present invention may have various other embodiments. Without departing from the spirit and essence of the present invention, those skilled in the art may make various corresponding modifications and variations according to the present invention, but all these corresponding modification and variation shall belong to the scope of the appended claims of the present invention.

INDUSTRIAL APPLICABILITY

The present invention solves how an eMSC should acquire the address of a conferencing server of a non ICS UE that has contracted a conference service, and also implements the conference service of the IMS centralized control service when the non ICS UE serves as the chairman.

What we claim is:

1. A method for implementing a chairman side conference service of an Internet Protocol (IP) Multimedia Subsystem (IMS) centralized service, the method comprising the following steps performed by an enhanced Mobile Switch Center (eMSC):

receiving a conference setup request originated by a chairman user equipment which is a non IMS centralized service user equipment;

sending a session request message for setting up the conference service to a conferencing server according to an address of the conferencing server to which said chairman user equipment belongs;

receiving a success response message returned by the conferencing server;

inviting one or more user equipments, which are already involved in a call session with said chairman user equipment, to the conference service; and returning a conference setup success message to said chairman user equipment after said one or more user equipments have begun to participate in the conference service.

2. The method as claimed in claim 1, wherein said eMSC acquires the address of the conferencing server to which said chairman user equipment belongs according to the following approach:

said eMSC receiving a location update request message of circuit switched domain from the chairman user equipment;

said eMSC originating a location update request message of mobile application part to a Home Subscriber Server (HSS); and said eMSC storing the address of the conferencing server to which said chairman user equipment belongs which is loaded into user data to be inserted into the eMSC or into a location update success response to be returned to the eMSC by the HSS, and returning a location update completion message to said chairman user equipment.

3. The method as claimed in claim 1, wherein said eMSC acquires the address of the conferencing server to which said chairman user equipment belongs according to the following approach:

the eMSC receiving a location update request message of circuit switched domain originated by the chairman user equipment, and completing location update of mobile application part between said eMSC and a Home Subscriber Server (HSS);

said eMSC originating a registration request message to a home IMS network and indicating that this registration request is originated by the eMSC instead of said chairman user equipment;

said eMSC receiving the address of the conferencing server to which said chairman user equipment belongs returned through a success response by a Call Session Control Function (CSCF) originating registration interaction with the HSS, wherein the address of the conferencing server is sent by the HSS to the CSCF or configured by the CSCF locally; and said eMSC storing the address of the conferencing server received, and returning a location update completion message to said chairman user equipment.

4. The method as claimed in claim 1, wherein said eMSC acquires the address of the conferencing server to which said chairman user equipment belongs according to the following approach:

said eMSC receiving a location update request message of circuit switched domain originated by the chairman user equipment, and completing location update of mobile application part between said eMSC and a Home Subscriber Server (HSS);

said eMSC originating a registration request message to a home IMS network and indicating that this registration request is originated by the eMSC instead of said chairman user equipment, and after the registration is successfully completed, returning a location update completion message to said chairman user equipment;

said eMSC sending a registration subscription message to a Call Session Control Function (CSCF), indicating the requirement for acquiring the address of the conferencing server of the user;

said eMSC receiving a success response message and a notification message carrying the address of the conferencing server to which said chairman user equipment belongs returned by the CSCF; and said eMSC returning a success response to the CSCF after receiving the messages, and storing the address of the conferencing server to which said chairman user equipment belongs.

5. The method as claimed in claim 4, wherein the address of the conferencing server to which said chairman user equipment belongs, which is returned by said CSCF to said eMSC through the notification message, is acquired from the HSS or is configured locally.

6. The method as claimed in claim 1, wherein said eMSC acquires the address of the conferencing server to which said chairman user equipment belongs according to the following approach:

said eMSC receiving a service request originated by the chairman user equipment; and said eMSC deriving the address of the conferencing server of said chairman user equipment from information of the service request or from stored information of the chairman user equipment.

7. The method as claimed in claim 6, wherein, said eMSC derives the address of the conferencing server to which said chairman user equipment belongs from one or more of a Mobile Country Code (MCC) of said chairman user equipment, a Mobile Network Code (MNC) of said chairman user equipment, a conference identifier, a network identifier and an agreed organization identifier.

8. The method as claimed in claim 6, further comprising:

if said service request is not for originating a conference service, said eMSC storing the derived address of the conferencing server to which said chairman user equipment belongs.

9. The method as claimed in claim 1, further comprising:

if the user equipment invited to the conference service is a multimedia subsystem user equipment, said eMSC directly instructing the user equipment to participate in the conference service;

the user equipment initiatively originating setup of a connection to the conferencing server; and said eMSC releasing a bearer to the user equipment, which is set up before the setup of the conference service.

10. The method as claimed in claim 1, further comprising:

if the user equipment invited to the conference service is an ordinary mobile terminal or fixed terminal, said eMSC instructing the conferencing server to invite a gateway, to which the user equipment belongs, to participate in the conference service instead of the user equipment; and said gateway originating setup of a bearer to the conferencing server, associating the bearer set up by the conference service with a bearer between said gateway and the user equipment, and releasing a bearer between said gateway and said eMSC, which is set up before the setup of the conference service.

* * * * *